(12) United States Patent
Kim et al.

(10) Patent No.: US 6,840,535 B2
(45) Date of Patent: Jan. 11, 2005

(54) AIR-BAG FOR A VEHICLE

(75) Inventors: Gun-Woo Kim, Kyunggi-do (KR);
Ik-Hwan Kim, Chungcheongnam-do (KR); Byong-Ryong Cho, Kyunggi-do (KR); Joon-Ho Kim, Seoul (KR);
Jung-Bae Ahn, Kyunggi-do (KR);
Jung-Soo Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/330,194

(22) Filed: Dec. 30, 2002

(65) Prior Publication Data

US 2004/0012181 A1 Jan. 22, 2004

(30) Foreign Application Priority Data

Jul. 18, 2002 (KR) ................. 10-2002-0041935

(51) Int. Cl.[7] .......................... B60R 21/16; B60R 21/28
(52) U.S. Cl. ..................................... 280/728.2; 280/739
(58) Field of Search ............................... 280/738, 739, 280/740, 742, 728.2

(56) References Cited

U.S. PATENT DOCUMENTS 5,100,172 A * 3/1992 VanVoorhies et al. ...... 280/738
5,605,347 A * 2/1997 Karlow et al. ........... 280/728.2
5,775,724 A * 7/1998 Tonooka et al. ......... 280/728.2

\* cited by examiner

*Primary Examiner*—Eric Culbreth
(74) *Attorney, Agent, or Firm*—Greenblum & Bernstein, P.L.C.

(57) ABSTRACT

Disclosed is an airbag for a vehicle capable of minimizing gas leakage in an early stage through gas discharge holes in a housing when spreading an air cushion. In both sides opposite to a first housing, the gas discharge holes are formed for emitting gas. A retainer on whose upper surface is fixed the air cushion, and in whose both sides are formed a coupling having coupling holes corresponding to the gas discharge holes, is provided. This coupling part is coupled to the first housing through the coupling device. The gas discharge holes are made lengthwise to make it possible to move the retainer up and down. As a result, when reading the air cushion, some of the holes are opened by movement of the coupling part. Besides, the coupling holes reformed in the lower side of the coupling part, so when not spreading the air cushion, the gas discharge holes are kept closed by the coupling part. In accordance with this structure, it is possible adopt a smaller capacity of the inflator as it can efficiently control the gas emitted to the outside through the gas discharge holes in the early stage of spreading the air cushion.

4 Claims, 4 Drawing Sheets

[FIG. 1]
Prior Art
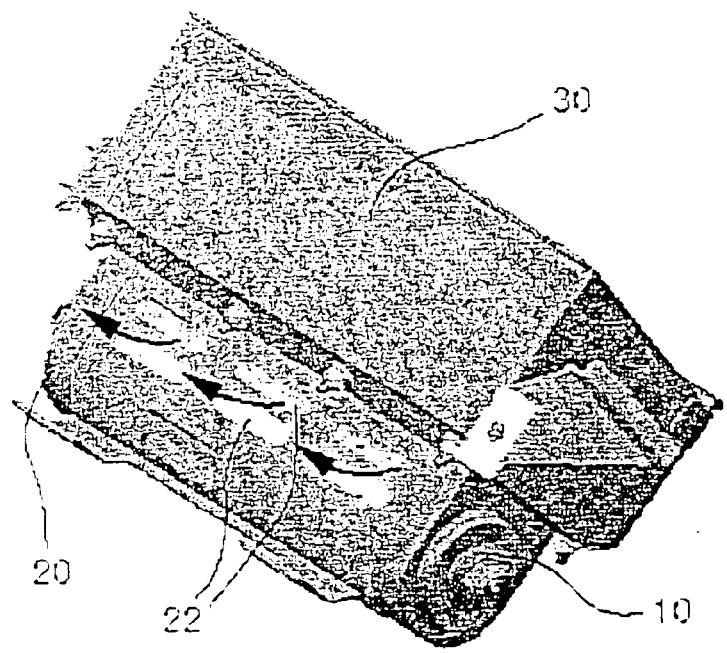
[FIG. 2]
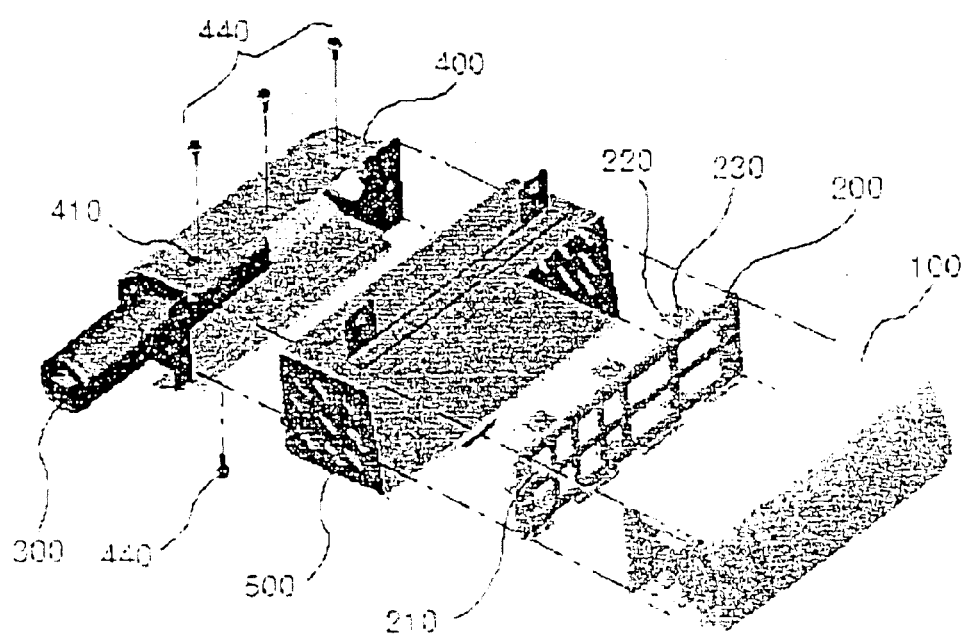

[FIG. 3]
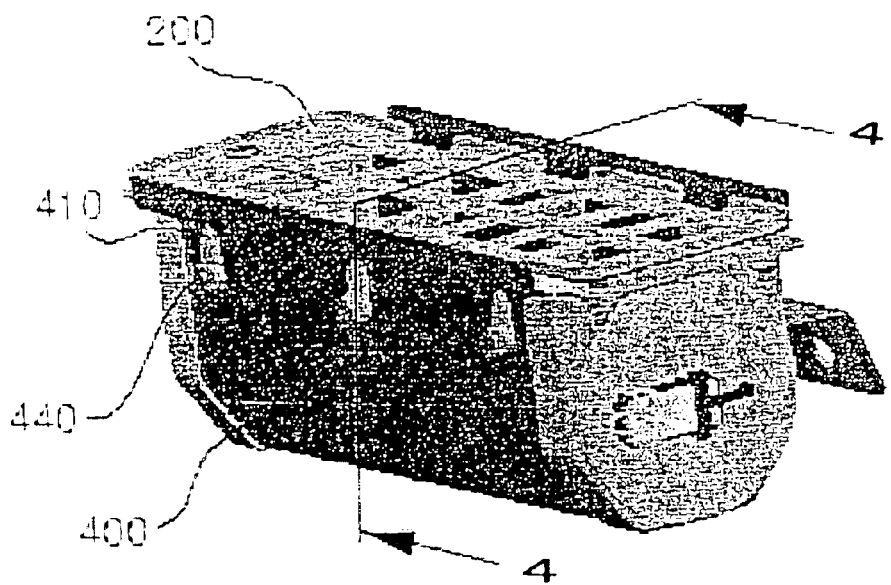
[FIG. 4]
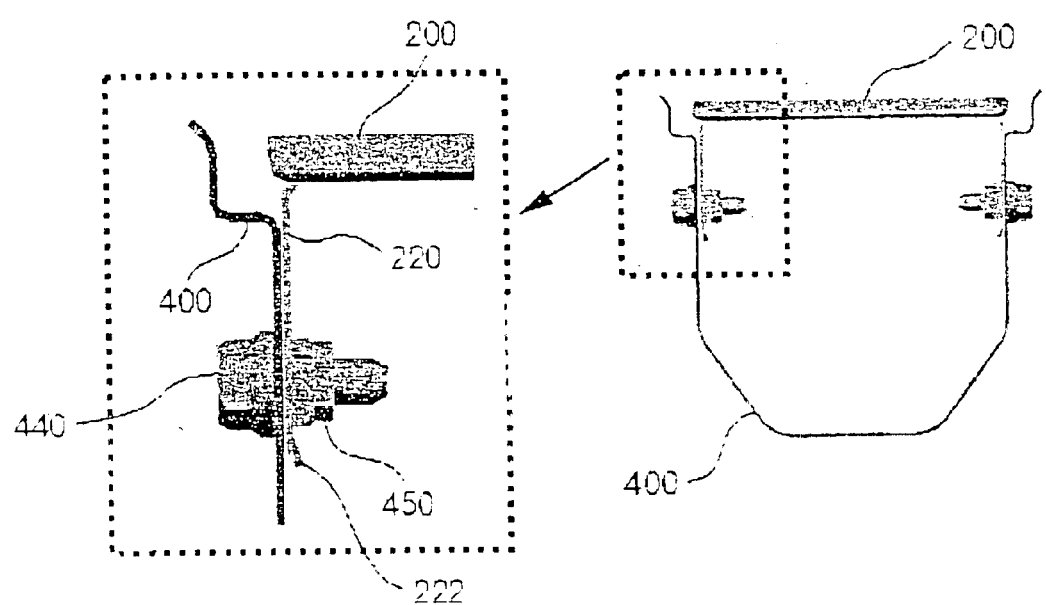

[FIG. 5]
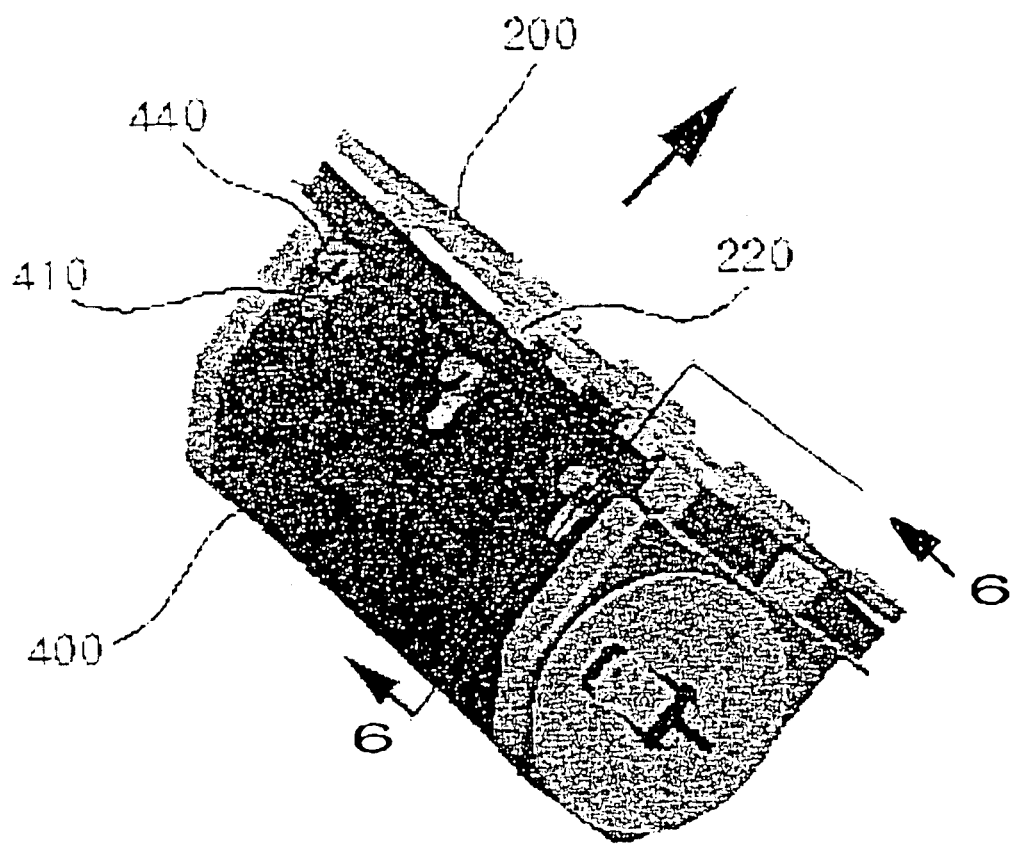

[FIG. 6]
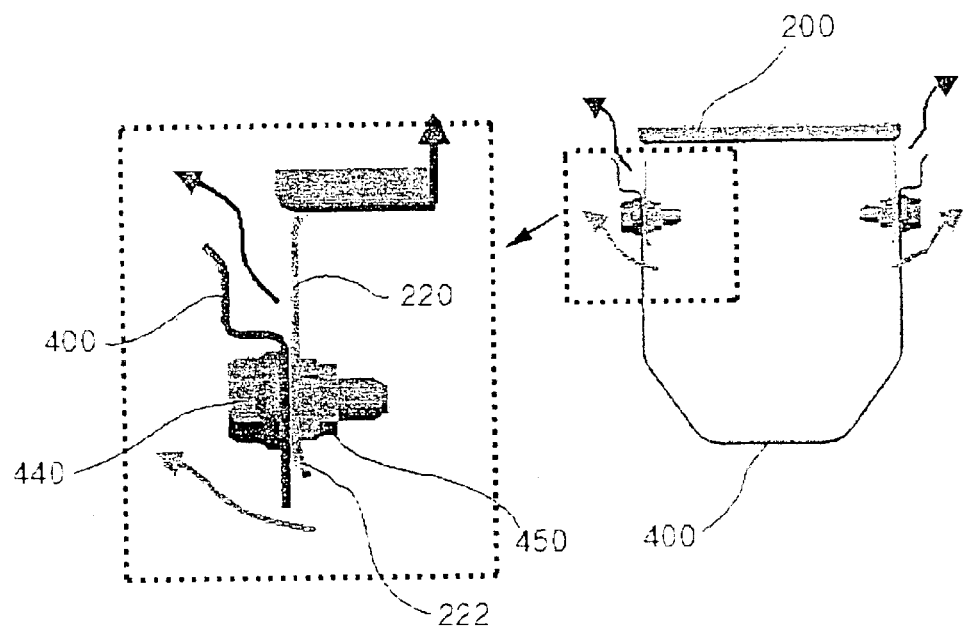
[FIG. 7]
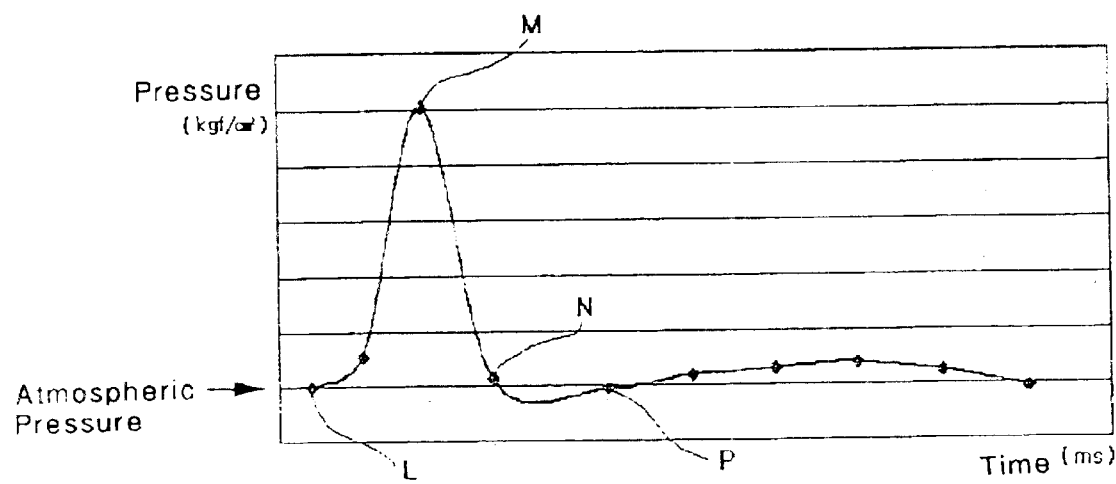

AIR-BAG FOR A VEHICLE

BACKGROUND OF THE INVENTION

1. Field of the Invention

The present invention relates to an airbag for a vehicle, more particularly to an airbag system for a vehicle which is capable of using a smaller capacity of inflator by preventing gas in a housing from being emitting to the outside in the early stage of spreading an air cushion.

2. Description of the Related Art

Recently, people are getting more and more interested in safety as well as functionality and convenience of a car when driving a car. As a result, the safety devices for protecting passengers also become important at automobile accidents as well.

Among these devices, an airbag system is used, along with a seat belt, to prevent a passenger in the head, breast or knees from being injured against constructions in the car in an automobile accident.

On the other hand, the airbag system is often installed in the front seat. Generally, it is classified into a driver airbag built in the steering wheel and a passenger airbag built on the passenger glove box or in the upper clash pad.

FIG. 1 is a perspective view illustrating the structure of a general passenger airbag. As illustrated in FIG. 1, a conventional airbag includes an inflator 10 for generating gas, an inflator housing 20 for accepting the inflator 10, and a retainer (not illustrated) fixed in the upper surface of the inflator housing 20.

In addition, an air cushion (not illustrated) is fixed in the upper surface of the retainer, and an air cushion housing 30 for accepting the air cushion is coupled to the upper surface of the inflator housing 20.

The inflator 10 is electrically connected to a sensor which senses a car collision, and it generates gas by means of signals from the sensor to be emitted into the air cushion.

The air cushion is accepted in the folded form in the air cushion housing 30 and expanded into a predetermined form by receiving gas from the inflator 10.

On the other hand, the air cushion includes gas discharge holes for emitting gas to the outside to alleviate the shock when in contact with a passenger in the condition wherein the cushion is spread or expanded.

Along with the air cushion, the inflator housing 20 includes a plurality of gas discharge holes 22 for doing the same thing with the gas discharge holes of the air cushion.

In short, when spreading the air cushion, the gas discharge holes 22 emit gas from the inflator housing 20 to the outside.

Accordingly, when the sensor detects collision at automobile collision, the signal for operating the airbag is applied to the inflator 10, and the gas from the inflator 10 is charged into the air cushion on the spur of the moment and prevents a passenger from being bumped against the front structure.

At this time, the gas generating from the inflator 10 is emitted to the outside through the gas discharge holes 22 built in the inflator housing 20 to alleviate the passenger's shock caused by momentarily excessive expansion pressure of the air cushion.

However, as for the conventional airbag structure, when spreading the air cushion in the early step, some of the gas from the inflator 10 is sent to the air cushion and at the same time, emitted to the outside through the gas discharge holes 22, which results in unwanted loss of gas.

Thus, when estimating the capacity of inflator 10, an additional amount of gas equal to that emitted to the outside through the gas discharge holes 22 in the early step of spreading the air cushion is required. That's why it is inevitable to use n inflator whose capacity is larger than that of actual inflator needed to spread the air cushion.

SUMMARY OF THE INVENTION

Therefore, the present invention has been made in view of the above problems, and it is an object of the present invention to provide an airbag for a vehicle for enhancing an efficiency of an inflator operation by avoiding a gas leakage through the gas discharge holes in the early stage, in an effort to prevent the gas from an inflator housing from being emitted to the outside by closing gas discharge holes in the early time when gas generates due to an inflator operation, and thereafter opening the gas discharge holes when the gas pressure gets high to a predetermined pressure in the inflator housing.

To achieve the above object, there is provided an airbag for a vehicle including an air cushion; an inflator for providing gas to the air cushion by generating it; a first housing for accepting the inflator, having gas discharge holes for emitting gas in both sides opposite to each other; a retainer for fixing the air cushion on its upper surface, including a coupling part having coupling holes corresponding to the gas discharge holes in both sides, and coupled to the first housing to move up and down; a coupling means for coupling the coupling part to the first housing; and a second housing for accepting the air cushion, coupled to an upper portion of the first housing, wherein the gas discharge holes are formed long in a upward and downward direction to make the retainer to move up and down so that some of the gas discharge holes are opened by movement of the coupling part when spreading the air cushion, and the coupling holes keep the gas discharge holes closed by means of the coupling part when not spreading the air cushion by being arranged in the lower portion of the coupling part.

At this time, the coupling means consists of bolts for being inserted into the coupling holes from the outside through the gas discharge holes, and nuts for being screw-coupled with the bolts.

In addition, a friction force between the coupling part and the first housing is controlled according to a coupling strength of the bolt.

On an end of the coupling part, a guiding part inclined with a predetermined angle towards the center part of the retainer is formed to guide gas flow easily to the gas discharge holes when emitting the gas through the gas discharge holes.

Accordingly, it can prevent the gas in the inflator from being emitted to the outside of the first housing by closing the gas discharge holes through the coupling part in the early stage when the gas generates due to the inflator.

Along with it, when the air cushion is fully spread or expanded as the gas pressure in the first housing forms over a predetermined pressure, the retainer moves upwards and opens the gas discharge holes to keep the gas pressure in the air cushion at a proper pressure.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view illustrating an airbag for a conventional vehicle.

FIG. 2 is an exploded perspective view illustrating an airbag for a vehicle in accordance with a preferred embodiment of the present invention.

FIG. 3 is a perspective view illustrating a coupled structure of a first housing and a retainer from FIG. 2.

FIG. 4 is a sectional view illustrating a sectional structure of 4—4 section from FIG. 3.

FIG. 5 is a state diagram illustrating how an airbag operates.

FIG. 6 is a sectional view seen from 6—6 section of FIG. 5.

FIG. 7 is a graph illustrating pressure changes in the air cushion as time goes by.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 2 is a perspective view illustrating an airbag for a vehicle in accordance with a preferred embodiment of the present invention.

With reference to FIG. 2, an airbag of the present invention includes an air cushion 100; an inflator 300 for providing inflator for generating gas and providing it to the air cushion 100; a first housing for accepting the inflator 300; a retainer 200 for fixing the air cushion 100 to the first housing 400; and a second housing 500 which accepts the air cushion 100 and which is coupled to the upper surface of the first housing 400.

More particularly, the inflator 300 is a kind of gas generating device, in which a gas generator and an ignition system for igniting the gas generator are equipped, and it is electrically connected to a collision sensor (not illustrated) placed in the front of a vehicle.

The inflator 300 is accepted in the first housing 400 which is an accepting case. One side of the first housing 400 is open, and on both sides, a plurality of gas discharge holes 410 are formed to emit gas to the outside to keep the gas pressure in the housing at a predetermined pressure when the air cushion 100 is expanded.

The retainer 200 fixes the air cushion 100 to its upper surface, and it is coupled to the upper part of the first housing 400.

In addition, the retainer 200 includes a plurality of vents 210 to allow the gas from the inflator 300 to flow into the air cushion 100 with ease.

On an end of the coupling part, a guiding part inclined with a predetermined angle towards the center part of the retainer is formed to guide gas flow easily to the gas discharge holes when emitting gas through the gas discharge holes.

Besides, coupling holes 230 are formed on the coupling part 220 for coupling with bolts 440 to screw-couple the retainer 200 to the first housing 400, corresponding to the gas discharge holes.

The second housing 500 is coupled to the first housing 400 to cover the air cushion 100 when the retainer 200 which fixes the air cushion 100 is coupled to the first housing 400.

On the other hand, as for an airbag of the present invention illustrated in FIG. 2, FIG. 3 is a perspective view showing that the retainer 200 is coupled to the first housing 400 where the inflator 300 is accepted. FIG. 4 shows a sectional structure of 4—4 section from FIG. 3, particularly a sectional view illustrating in detail how the first housing 400 and the retainer 200 are coupled.

With reference to FIG. 3 and FIG. 4, the retainer 200 is placed on the opened upper surface in the first housing 400 and is coupled to move up and down.

In addition, to move the retainer 200 up and down, the gas discharge holes include long holes whose widths of the upper and lower sides are bigger than those of the right and the left sides.

Accordingly, the retainer 200 is fixed to the first housing 400 after the bolt 440 is screw-coupled to the nut 450 through the gas discharge hole 410 and coupling hole 230 in the state of the coupling part opposite to the inside of the first housing 400.

As it is difficult to screw-couple the nut 450 when the retainer 200 is coupled to the first housing 400, it is desirable to couple the nut 450 to the coupling part 220 in one unit by using a predetermined welding means to screw-couple the bolt 440 and the nut 450 with ease.

In addition, it is possible to control the operation time and pressure of the retainer 200 with the bolt 440.

In other words, it is possible to control the movement of the retainer 200 properly as there is a different friction force between the inside of the first housing 400 and the coupling part 220 opposite to the inside of the first housing 400 in accordance with the coupling strength of the bolt 440.

For example, if the coupling strength of the bolt 440 is given high, the friction force between the coupling part 220 and the first housing 400 increase. As a result, it requires more force when moving the retainer 200.

On the contrary, if the coupling strength of the bolt 440 is given low, the friction force between the coupling part 220 and the first housing 400 reduces, so it is possible to move the retainer 200 with smaller force.

On the other hand, when not spreading the air cushion, the gas discharge holes 410, as illustrated in the drawing, are kept closed by means of the coupling part 220.

It is desirable for the coupling part 220 to form an area larger than the gas discharge hole 410 to make it possible to open and close the gas discharge hole 410.

Besides, when not spreading the air cushion, it is desirable to form the coupling hole 230 in the lower portion of the coupling part 220 to make it possible to close the gas discharge hole 410 with ease by the means of the coupling part 220.

Along with it, it is possible to control pressure in the first housing 400 by controlling the size of the gas discharge hole 410 or controlling upper and lower sliding distance of the retainer 200 in accordance with the coupling strength of the bolt 440.

On the other hand, the coupling part 220 includes in its lower surface a guiding part 222 formed on the slant towards the center of the retainer 200.

When spreading the gas discharge holes 410 by means of the coupling part 220, the guiding part 222 plays a part of guiding the gas flowing in the first housing smoothly to the gas discharge holes 410.

FIG. 5 is a state diagram illustrating how gas is emitted from the first housing 400 in accordance with the movement of the retainer 200 when spreading the air cushion. FIG. 6 is a sectional view seen from 6—6 section of FIG. 5.

Above all, when the electrical signal is given to the inflator 200 to operate the air cushion, as the shock is detected by the collision sensor (not illustrated) at an automobile collision, the gas generator in the inflator 300 starts to ignite and generates operation gas.

Here, in the early stage of generating gas in accordance with operation of the inflator 300, the gas pressure is created low in the first housing 400. As a result, the gas in the first housing 400 is not emitted to the outside. As illustrated in FIG. 3 and FIG. 4, it is emitted to the inside of the air cushion as the gas generating holes 410 are closed by the coupling part 220.

Thereafter, when the gas pressure in the first housing 400 reaches to a predetermined pressure as a predetermined time goes by, the air cushion is fully spread or inflated by means of the gas pressure and at the same time the retainer, fixed to the air cushion by means of momentary upward repulsive force when the air cushion is spread, gets separated at predetermined intervals as it is lifted from the first housing 400.

Accordingly, the gas discharge hole 410, closed by the coupling part 220, gets partly opened, and the gas charged in the first housing 400 through these open spaces are emitted to the outside.

At the same time, the inner gas, along with the gas discharge holes through the open space between the retainer 200 and the upper surface of the first housing created by the movement of the retainer 200, is emitted to the outside continuously.

On the other hand, FIG. 7 is a graph illustrating pressure changes in the air cushion as time goes by when spreading the airbag in accordance with the present invention.

Here, in the reference codes, L indicates the time of the generation of pressure, and M indicates the time of the explosion of door, and N indicates the time of the generation of negative pressure, and P indicates the time from negative pressure to constant pressure.

As illustrated in the drawing, in the early stage of operation of the inflator 300, the pressure in the air cushion is created with the same pressure with atmospheric pressure (L), and thereafter it reaches to a predetermined pressure for the air cushion to explode the door and be projected at the same time (M).

Accordingly, in the air cushion, the front projection speed of the air cushion is created in a moment more strongly than the gas generating speed from the inflator 300, which leads the pressure of the air cushion to the vacuum state (negative pressure) lower than the atmospheric pressure (N).

At this time, as a temporary vacuum state is created in the air cushion as illustrated in the above, the air from the outside is momentarily inhaled through the open gas discharge holes 410 of the first housing 400 and flowed into the air cushion along with the gas.

Thereafter, the gas generating in the inflator 300, as a predetermined time goes by, is flowed into the air cushion continuously, and the pressure in the air cushion is kept at a predetermined state by going through the negative pressure to the constant pressure again.

According to the present invention, the gas discharge holes are kept closed by means of the coupling part in the early stage of the airbag operation, so it is possible to prevent early gas from being emitted to the outside of the first housing in accordance with operation of the inflator.

Therefore, it is possible to adopt a smaller capacity inflator, as additional capacity of gas leaked to the outside through the gas discharge holes is not required, which leads to a reduction in weight and installation cost of the airbag.

In addition, when spreading the air cushion to the full, it is possible to emit the gas to the outside smoothly through the gap of the upper surface of the first housing created with movement of the retainer and the gas discharge holes opened by movement of the retainer followed by upward projection force of the air cushion, which alleviates the shock against a passenger in accordance with the spreading of the air cushion.

Along with it, when spreading the air cushion, it is possible to inhale the air from the outside to the air cushion by using temporary vacuum state (negative pressure) in the air cushion in accordance with the opening of the gas discharge holes, which makes it possible to adopt a smaller capacity of inflator in consideration of this.

Besides, by properly controlling the friction force between the coupling part and the first housing through the bolts, it can control the time of the opening of the gas discharge holes with ease in accordance with upward projection of the retainer as necessary.

In addition, by guiding the gas flowing towards the gas discharge holes smoothly by forming an additional guiding part in the end of the coupling part, it is possible for the gas to be emitted through the gas discharge holes more efficiently and swiftly.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An airbag for a vehicle, comprising:

an air cushion;

an inflator that provides gas to the air cushion by generating gas;

a first housing that accepts the inflator, having gas discharge holes that emits gas in sides opposite to each other;

a retainer that fixes the air cushion on its upper surface, comprising a plurality of coupling parts each having a coupling hole corresponding to a respective one of the gas discharge holes in both sides, and coupled to the first housing to move up and down;

a coupling device that couples the coupling part to the first housing; and a second housing that accepts the air cushion, coupled to an upper portion of the first housing, wherein the gas discharge holes are formed elongated in a upward and downward direction to permit the retainer to move up and down so that a portion of the respective gas discharge holes are opened by movement of the coupling part when spreading the air cushion, and the respective coupling holes keep the gas discharge holes closed by the coupled part when not spreading the air cushion by being arranged in a lower portion of the coupling part.

2. The airbag for the vehicle according to claim 1, wherein the coupling device comprises bolts insertable into the coupling holes from the outside through the gas discharge holes, and nuts threadably engageable with the bolts, and a friction force between the coupling part and the first housing is controlled according to a coupling strength of the bolt.

3. The airbag for a vehicle according to claim 1, wherein a guiding part inclined with a predetermined angle towards the center part of the retainer is formed to guide gas flow easily to a respective gas discharge hole on an end of the coupling part when emitting gas through the gas discharge holes.

4. The airbag for a vehicle according to claim 1, when a guiding part inclined with a predetermined angle towards the center part of the retainer is formed to guide gas flow easily to a respective gas discharge hole on an end of the coupling part when emitting gas through the gas discharge holes.

* * * * *

UNITED STATES PATENT AND TRADEMARK OFFICE
CERTIFICATE OF CORRECTION

PATENT NO. : 6,840,535 B2
DATED : January 11, 2005
INVENTOR(S) : G.W. Kim et al.

It is certified that error appears in the above-identified patent and that said Letters Patent is hereby corrected as shown below:

<u>Title page,</u>
Item [57], ABSTRACT,
Line 5, after "retainer" insert -- , --.
Line 11, "reading" should be -- spreading --.
Line 13, "reformed" should be -- are formed --.
Line 17, after "possible" insert -- to --.

<u>Column 6,</u>
Line 47, "coupled" should be -- coupling --.

Signed and Sealed this

Thirtieth Day of August, 2005

JON W. DUDAS
*Director of the United States Patent and Trademark Office*